(12) United States Patent
Schiltz et al.

(10) Patent No.: US 12,180,903 B2
(45) Date of Patent: Dec. 31, 2024

(54) MIXED FUEL SYSTEM

(71) Applicant: American Power Group, Inc., Algona, IA (US)

(72) Inventors: Michael A. Schiltz, Algona, IA (US); Steven Ferguson, Saint Joseph, MO (US)

(73) Assignee: American Power Group, Inc., Algona, IA (US)

( * ) Notice: Subject to any disclaimer, the term of this patent is extended or adjusted under 35 U.S.C. 154(b) by 0 days.

(21) Appl. No.: 18/452,988

(22) Filed: Aug. 21, 2023

(65) Prior Publication Data

US 2023/0392560 A1   Dec. 7, 2023

Related U.S. Application Data

(63) Continuation-in-part of application No. 17/676,673, filed on Feb. 21, 2022, now Pat. No. 11,732,661, which is a continuation-in-part of application No. 16/291,141, filed on Mar. 4, 2019, now Pat. No. 11,255,279.

(60) Provisional application No. 62/637,902, filed on Mar. 2, 2018.

(51) Int. Cl.
*F02D 19/08* (2006.01)
*F02D 19/06* (2006.01)
*F02D 41/00* (2006.01)

(52) U.S. Cl.
CPC ....... *F02D 19/081* (2013.01); *F02D 19/0615* (2013.01); *F02D 19/0642* (2013.01); *F02D 19/066* (2013.01); *F02D 41/0025* (2013.01); *F02D 2200/0406* (2013.01); *F02D 2200/0414* (2013.01); *F02D 2200/0625* (2013.01); *F02D 2200/101* (2013.01); *F02D 2200/602* (2013.01)

(58) Field of Classification Search
CPC .............. F02D 19/081; F02D 19/0615; F02D 19/0642; F02D 19/066; F02D 41/0025; F02D 2200/0406; F02D 2200/0414; F02D 2200/0625; F02D 2200/101; F02D 2200/602
See application file for complete search history.

(56) References Cited

U.S. PATENT DOCUMENTS

| | | | |
|---|---|---|---|
| 11,873,772 B1* | 1/2024 | Anderson | F02D 41/1446 |
| 2012/0109496 A1* | 5/2012 | Hylands | F02D 19/105 |
| | | | 701/103 |
| 2019/0040804 A1* | 2/2019 | Atterberry | F02D 41/1497 |
| 2020/0003137 A1* | 1/2020 | Pedder | F02D 19/081 |

* cited by examiner

*Primary Examiner* — Audrey B. Walter
(74) *Attorney, Agent, or Firm* — David M. Breiner; BrownWinick Law Firm

(57) ABSTRACT

The present invention provides a novel combination of devices to measure and transmit to an electronic controller data pertaining to differential pressures, temperatures, regeneration status, exhaust content, accumulated gas consumption and substitute fuel consumption. The electronic controller compares the data to thresholds; when the controller receives signals indicating these thresholds or limits are met, the controller causes the gas substitution rate to be diminished or set to zero until after-treatments elements are fully regenerated thereby facilitating integration of a mixed fuel system with an application internal combustion engine.

17 Claims, 11 Drawing Sheets

MIXED FUEL SYSTEM

CROSS REFERENCE TO RELATED APPLICATIONS

This application is a continuation-in-part of U.S. patent application Ser. No. 17/676,673 which was filed with the United States Patent and Trademark Office on Feb. 21, 2022 which in turn is a continuation-in-part application of U.S. patent application Ser. No. 16/291,141 which was filed with the United States Patent and Trademark Office on Mar. 4, 2019 and which claims the benefit of U.S. Provisional Application No. 62/637,902 which was filed with the United States Patent and Trademark Office on Mar. 2, 2018, the entirety of each of which is incorporated herein fully by reference.

BACKGROUND

Diesel fuel consumption through any stationary or vehicular diesel engine is regulated by the acting engine governor, whether that governing function is a driver, an electronic control module (ECM) or other electro-mechanical device. In the case of a vehicular engine, the overall governor is most often the driver acting to accelerate the vehicle under a given set of load conditions and to reach and/or maintain a desired road speed. The driver typically uses the foot pedal to accelerate the vehicle to a desired speed, but may also use cruise control functions to accelerate, decelerate or maintain that set speed.

Mixed fuel systems (a.k.a. dual fuel systems) provide a viable means of reducing monetary and environmental costs incurred through the operation of internal combustion (IC) engines which would otherwise burn a single, traditional fuel such as diesel. When diesel fuel consumption is replaced in part by use of a more environmentally-friendly and less expensive secondary fuel, such as natural gas, there is an opportunity both to improve overall fuel economy and to reduce harmful exhaust gas emissions.

Prior-art mixed fuel systems generally include an electronic control module (ECM) to monitor base diesel engine parameters as well as the status of a natural gas component. These systems utilize data from a number of sensors (e.g. engine speed, manifold intake pressure, gas regulator pressure, etc.); either through direct sensing and/or through serial bus communications with the IC (internal combustion) engine ECM, in order to control the mixture of fuels to the engine.

Certain of these prior art systems utilize high-pressure fuel injection to flow gas directly into each combustion cylinder, while other so-called "fumigation" systems introduce gas either pre-turbo or post-turbo into the air intake manifold. To wit, high pressure systems use natural gas-compatible fuel injectors while low-pressure fumigation systems control natural gas flow simply with a manually-set trim valve or using an electronically-controlled variable gas flow valve solution.

While high-pressure injection directly into each cylinder does allow for high gas flow rates, timed to coincide with externally-controlled diesel combustion events, the underlying mixed-fuel systems are relatively costly, difficult to install, often unreliable and potentially unsafe. In contrast, less complex, low-pressure fumigation systems have proven to be more cost-effective and reliable, but may also compromise both fuel economy savings and emissions performance.

In particular, prior art fumigations systems lack direct and variable control over diesel injection pulse width, instead relying on compliance from external engine governor functions, such as a driver, vehicle cruise control (VCC) or an engine speed governor to reduce diesel consumption. This may lead to sub-optimal fuel economy as well as compromised engine performance.

Similarly, these systems do not adjust diesel injection timing, which in turn may contribute to excessive exhaust gas emissions associated with over-fueling, incomplete combustion and/or insufficient fresh air make-up. The resulting tradeoffs are particularly evident with more advanced vehicular diesel engines that utilize after-treatment technology such as exhaust gas recirculation (EGR), diesel particulate filters (DPF) and selective catalyst reduction (SCR) subsystems.

For example, U.S. Pat. No. 8,267,064 discloses apparatus to control dual fuel for a fuel injected engine by emulating electrical characteristics of a primary fuel injector to create an alternative signal which, in turn, controls the fuel supply. Additionally, U.S. patent application Ser. No. 13/034,946 discloses an engine modification that controls signal timing via emulation of engine sensors. In this disclosure, engine speed and position sensor data is modified with the aim of controlling diesel fuel injection in a dual-fuel engine. And, U.S. Pat. No. 5,370,097 discloses an assembly to shut off diesel.

When the driver and/or extant load conditions demand maximum diesel fuel consumption, the introduction of an additional, secondary fuel is not possible without overpowering the engine unless the diesel demand itself is limited. Prior art mixed fuel systems attempt to resolve this constraint in a number of different ways, for example, using one or more of: secondary fuel is turned off when peak diesel demand is reached; diesel demand is shunted by an external electro-mechanical shut-off valve, thus allowing for secondary fuel to be mixed; or diesel demand is modulated by a bypass/slave ECM that assumes direct control over diesel injectors, again allowing for secondary fuel to be mixed.

While turning off the secondary fuel source does prevent any excess power concerns with the engine itself, fuel economy savings achieved through use of a more cost-effective secondary fuel source are greatly diminished for many real-world applications. And while electro-mechanical shut-off valves do allow a cost-effective diesel-demand limit, these create drivability and reliability concerns, especially in the event of a shut-off valve failure.

Direct control over diesel fuel injectors through modification of the base ECM pulse-width modulation (PWM) allows for substantial increase in secondary fuel consumption. However, the dual fuel solutions that take this approach are very expensive in terms of development effort, drive-away cost and installation time. Moreover, these systems have proven to be somewhat unreliable due to their complexity. As well, some such systems do not allow for full return to diesel-only operation and therefore leave the engine in a de-rated condition in the event of underlying component failure.

U.S. Pat. No. 8,267,064 modifies diesel injection pulse width whereas U.S. Pat. No. 5,370,097 shuts off diesel for non-injection systems—these both solve the substitution limitation associated with high diesel demand, but suffer from inefficiencies relating to emissions control.

Other diesel engines typically comprise some means to address pollutants that would otherwise exit the exhaust system of a diesel engine. But these after-treatment subsystems and their components are designed for diesel-only operation and may be inadequate for mixed fuel operation. When employed in a mixed-fuel environment, the operation and set up of these after-treatment subsystems is inefficient, i.e., the strategies employed for use of these after-treatment subsystems in a diesel only environment are often inadequate in a mixed-fuel environment. Current strategies often incorporate a calculation for accumulated diesel fuel consumption to determine when the after-treatment components (e.g. DPF) must be regenerated. In a mixed fuel environment, this calculation is likely to regenerate long after regeneration was actually needed because less diesel will be consumed per unit of time the engine is working. Some current protection strategies also use differential pressure readings to determine when regeneration is required, however, in a dual fuel environment "face plugging" of the diesel oxidation catalyst may occur resulting in erroneous DPF readings. These readings, in turn, cause problems with regeneration. Further, the change in fuel content changes the content of the exhaust. Soot production is also increased under some conditions.

There was, therefore, a need for a cost-effective mixed-fuel system with precise and independent control over natural gas and diesel flow rates as well as an enhanced capability for optimizing exhaust gas emissions.

SUMMARY

The aforementioned problems and challenges in the dual-fuel environment necessitate augmentation in after-treatment protection strategies which, in the present invention, is achieved by a novel combination of devices to measure and transmit to an electronic controller data that is indicative of differential pressures, temperatures, regeneration status, exhaust content, accumulated gas consumption and substitute fuel consumption. In general, an electronic controller receives the data provided by the sensor and compares it to protection thresholds for mixed fuel operation. When the controller receives signals indicating these thresholds or limits are met, the controller causes the gas substitution rate to be diminished or set to zero until after-treatments elements are fully regenerated.

The present invention preserves the most cost effective means for integrating a mixed fuel system with an application internal combustion engine. The internal combustion engine may include standard components such as a serial bus, diesel fuel control, exhaust gas recirculation, diesel oxidation catalyst, diesel particulate filter and selective catalytic reduction after-treatment subsystems. The presently disclosed mixed fuel system for the internal combustion engine comprises emissions feedback control and EGR control methods for protection of a diesel particulate filter and a diesel oxidation catalyst. The mixed fuel system of the present invention includes an electronic controller (also described as a Dual fuel controller, electronic control module), sensors, and serial bus communications with the internal combustion engine controller, as well as gas regulation components appropriate for fumigation-based control. In addition, the present invention also incorporates methods and apparatus necessary for achieving independent diesel fuel control as well as exhaust gas emissions control. The present invention facilitates monitoring and/or controlling exhaust gas recirculation (EGR) emulation, protecting diesel oxidation catalyst (DOC), and monitoring a diesel particulate filter (DPF) and it monitors a selective catalytic reduction (SCR) after-treatment subsystem. The present invention provides means to protect the SCR by shutting off dual fuel operation while the SCR is active.

In general, then, the dual fuel system includes gas train components, sensors, at least one networked controller, control software and a user display. Circuits necessary to provide an interface to the base diesel engine and emulation of functionality can be incorporated into the controller.

1. Diesel Demand Limiting

The present invention implements several different methods for diesel demand reduction. Each specific implementation depends on the particular diesel engine controls interface utilized by a given application engine. The included range of methods allows the mixed fuel system to limit diesel demand for a wide variety of engine control configurations.

One preferred approach to diesel demand limiting is employed by the present invention. This approach interrupts and emulates driver controls to the engine ECM itself, namely the accelerator pedal input and the cruise control activation switch. Emulation of the pedal input signal may involve several different electrical interfaces including but not necessarily limited to: Single analog throttle position sensor (TPS) signal; Dual analog TPS signal; and Single Pulse Width Modulation (PWM) signal.

The pedal signal in any format is intercepted by the dual fuel controller and then, through use of fuel maps which facilitate the determination by the dual fuel controller of the appropriate gas substitution rate, the pedal signal is modified to reflect a diminished diesel demand during the mixed fuel mode of operation. Alternatively, a separate circuit or device may be employed to intercept and modify the signal. The emulated pedal signal sent to the engine ECM indirectly leads to reduced injector pulse width modulation (PWM) and less demand for diesel/fuel which in turn allows for introduction of the secondary fuel in a precisely controlled manner. Self-test and diagnostic criteria for the signal itself are also satisfied by the emulated signal output.

During vehicle cruise control (VCC) operation, the cruise activation switch is also intercepted, modified by the dual fuel controller and returned to the engine ECM. In this manner, the actual VCC functions (accelerate, decelerate, set speed, etc.) can also be emulated through the dual fuel controller. Apart from the cruise control activation switch itself, the status of certain other VCC push button controls is read via the vehicle serial bus interface, in accordance with J1939 Controller Area Network (CAN) or J1587 serial communication standards.

The VCC speed control function is assimilated by the dual fuel controller using the emulated pedal signal to control diesel demand and an electronic throttle body (ETB) to modulate gas. Alternatively, a variable gas flow control valve can provide this function. An Electronic throttle control (ETC) is technology that electronically "connects" an accelerator pedal of the vehicle to the throttle on the vehicle's engine, replacing a mechanical linkage. A typical ETC system consists of three major components: (i) an accelerator pedal module which may include sensors, (ii) an electronic throttle body (which is a throttle valve that can be opened and closed by an electric motor), and (iii) the engine control module ECM. The ECM employs software to determine the required throttle position. The software performs calculations from data measured by sensors, including the accelerator pedal position, engine speed, vehicle speed, and cruise control switches. The electric motor of the electronic throttle body is used to open or close the throttle valve as needed to meet the demands. Key to the present invention is the fact that the electronic throttle body (ETB) can cause the throttle to be moved irrespective of the position of the driver's accelerator pedal. The fuel mixture is thus controlled in a manner that replicates intended VCC operation.

A second preferred approach to diesel demand limiting involves bypass of the primary accelerator pedal input through a remote pedal interface. Since engine ECMs are designed to allow for remote pedal operation (e.g. in work-truck applications), activated by a separate signal input, the same functionality can be achieved without interruption of the primary pedal input. With the remote pedal input and emulation of VCC operation, diesel demand can be controlled by the dual fuel controller, allowing significant substitution of a secondary fuel. This is the preferred embodiment for engines with J1708/J1587 serial or proprietary CAN busses.

The third, but most preferred method for limiting diesel demand involves direct control of the engine using the J1939 Torque Speed Command (TSC) interface. The TSC allows the engine torque and/or speed to be monitored and limited by an externally networked device, in particular the dual fuel controller. For J1939 capable engines, this method allows the dual fuel controller to manage engine torque and also substitute the secondary fuel in place of diesel in a highly controlled manner during all modes of engine operation.

2. Emissions Control & after Treatment Protection

While mixed fuel engines have the potential to reduce fuel costs, especially through independent control of both natural gas and diesel, their operation also affords opportunity to improve greenhouse gas (GHG) emissions in relation to commensurate diesel-only operation, in particular oxides of nitrogen (i.e. NOx). However, an over-emphasis on fuel savings benefits in the design and implementation of dual fuel systems may result in unintentional compromise of emissions performance as well as an unnecessary increase in the overall lifecycle cost of operation due to the associated impact on modern, diesel engine after-treatment systems.

The present invention, therefore also employs a comprehensive real-time emissions control and after-treatment protection strategy to maximize emissions benefits as well as fuel savings while maintaining the reliability of after-treatment components themselves. The dual fuel control system of the present invention monitors and controls several different engine parameters, gas system parameters, and exhaust parameters and controls these parameters by controlling diesel demand, gas flow, exhaust gas recirculation, and by monitoring DOC and DPF.

a. Emissions Feedback Control

For control of the combustion process, the dual fuel control system monitors various engine parameters such as engine speed, engine load, exhaust gas temperature (EGT), diesel fuel consumption, etc. These parameters are acquired through direct sensing as required and/or through the diesel ECM serial bus connection.

The dual fuel system monitors gas system parameters such as gas pressure, temperature and flow rate. The latter is accomplished through use of a gas-compatible hot-wire anemometer, differential pressure and fuel temperature sensing, a Coriolis meter, or through gas flow estimation.

The dual fuel ECM also monitors exhaust parameters, such as $NO_x$ and $O_2$ concentration level, as well as exhaust gas pressure and temperature at various points in the after-treatment system. As with engine parameters, acquisition is accomplished through direct sensing or indirectly through the serial bus connection.

While prior art systems do claim to improve exhaust gas emissions through the combustion of natural gas in the fuel mixture, these systems do not actively monitor or control emissions content. Instead, the present invention controls diesel demand, gas flow and exhaust gas recirculation, all while monitoring exhaust gas conditions, for the express purpose of optimizing both fuel economy and emissions performance. In summary, this basic responsiveness to emissions benefits (in addition to lifecycle cost savings) is at the core of the novel control system.

b. EGR Control

Although dual fuel combustion is known to reduce $NO_x$, it may also result in increased soot production, especially at higher levels of gas substitution and at higher (e.g. >80%) engine loads. This is in part due to a relatively rich fuel mixture, especially under higher diesel flow conditions, but may also result from the methane slip that is endemic to any fumigation system.

Particulate matter (PM) production is further impacted by the use of an exhaust gas recirculation (EGR) valve, which is intended to reduce $NO_x$. At moderate engine loads, where excess oxygen and elevated temperature may otherwise increase $NO_x$ production, the inert exhaust gas is re-circulated through the engine air intake in place of fresh oxygen. The exhaust gas is also passed through an EGR cooler to lower the intake air temperature, which further acts to lower $NO_x$ concentration.

Most diesel engines control the EGR in an open-loop manner based on a combination of diesel fuel injection pulse width, engine load and engine speed. However, since the combustion of natural gas reduces the need for diesel fuel, the engine ECM perceives reduced engine load and therefore increases EGR as described above to reduce $NO_x$.

Increase in EGR leads to limited supply of fresh oxygen required for complete combustion of the total fuel mixture, a related loss in overall fuel efficiency and a marked increase in soot production. The elevated soot levels increase service demand for regeneration of the diesel particulate filter (DPF) and also lead to possible DPF failure. These problems are exacerbated by the introduction of SCR after-treatment systems, which are inherently more responsive to NOx production.

3. Feed-Forward and Feedback Controls

The present invention provides means to employ a base fuel mixture of diesel and a secondary fuel. The mixture is controlled by applying an algorithm employing variables that dictate the gas flow rate, position of the electronic throttle body (ETB) and the diesel demand limit. The fuel mixture is achieved by using a gas substitution ratio (GSR) which dictates the ratio of primary fuel (diesel, in this example) that is to be displaced by a secondary fuel (e.g., natural gas). The GSR to be employed to the mix is controlled by the controller employing a fuel map which, in essence, provides a multidimensional look-up table which relates the GSR to at least one of the control input parameters in either a feedback or feedforward regime.

GSR may be defined as a feed-forward function of any one or more of pedal position, engine speed and engine load for a specified range of each of those variables. i.e. for a given instance of each input value, a particular GSR results in the requisite fuel mixture.

Additionally or alternatively, feed-back variables in the exhaust may be monitored such as NOx and EGT, and the EGR valve and the GSR may be adjusted accordingly to cause the exhaust to more closely meet the target fuel mixture and exhaust limitations.

The present invention actively controls the EGR during dual fuel operation. EGR control is achieved through manipulation of one or more of four input signals to the diesel engine ECM. Any or all of these signals is intercepted and then modified to achieve the expected diesel-only EGR level. These signals may include barometric pressure, EGR pressure, manifold pressure, intake manifold pressure.

Through active EGR control, NOx concentration is maintained at or below diesel-only levels while soot production may be reduced by a factor of five or more. Less soot reduces the need for DPF regeneration and, therefore, fuel consumed for after-treatment. Less soot also extends the useful life of the DPF itself.

4. DPF and Doc Component Protection

Even with active EGR control, the diesel oxidation catalyst (DOC), diesel particulate filter (DPF) and Selective Catalyst Reduction (SCR) subsystems should be protected during dual fuel operation. In addition to the potential soot load increase from dual fuel operation, most after-treatment systems regenerate the DPF in part based on diesel fuel consumption over time. Since the diesel fuel consumption rate is reduced even though overall fuel consumption is not, the DPF in prior art dual fuel systems may not be adequately protected from soot build up. The present invention provides protection for these components that were originally designed for diesel-only operation.

Current strategies often incorporate calculations to determine accumulated diesel fuel consumption to determine when the after-treatment components (e.g. DPF) must be regenerated. However, in the present invention, diesel consumption is replaced by the use of a substitute fuel and, therefore, DPF regeneration (which is triggered by diesel consumption) must be implemented via a different trigger.

In prior art engines, differential pressure readings across after-treatment devices may be used to determine when regeneration is required. However, the pressure readings in a mixed-fuel operational environment are not as reliable as in a diesel only context and, therefore erroneous DPF readings may occur resulting in problems with regeneration.

As is known, exhaust content profile changes in accordance with the fuel mixture. Soot production may increase.

The present invention monitors the after-treatment component status via measurement of differential pressures, temperatures, regeneration status using serial bus communications or installed sensors. In general, as is known in the art, the system protects against damage to the DPF and DOC by limiting or prohibiting the combustion of gas during the passive and active regenerative process by controlling an injector that periodically cleans out the soot in the DOC/DPF by combusting diesel fuel at 900 F. The diesel ECM also pumps DEF/UREA to react the NOx in the exhaust, leaving inert N2, H2O and O2.

The present invention protects the DOC and DPF by actively monitoring DPF differential pressure, DOC and DPF temperatures, as well as the DPF regeneration status, either through direct sensing and/or through serial bus communications. It detects issues, and causes shut off of the gas. In this manner, the present invention is able to prevent excessive soot accumulation in the DPF and manages the production of NOx. In this manner the after treatment system is not overtaxed. The dual fuel system accomplishes these objectives through control of gas flow, diesel demand limiting and EGR control.

All of these protective measures serve to extend the life of the after-treatment components and reduce lifecycle costs associated with dual-fuel operation.

The dual fuel control systems of the present invention address several known problems that otherwise plague prior art dual fuel systems.

DETAILED DESCRIPTION

Figure 1:
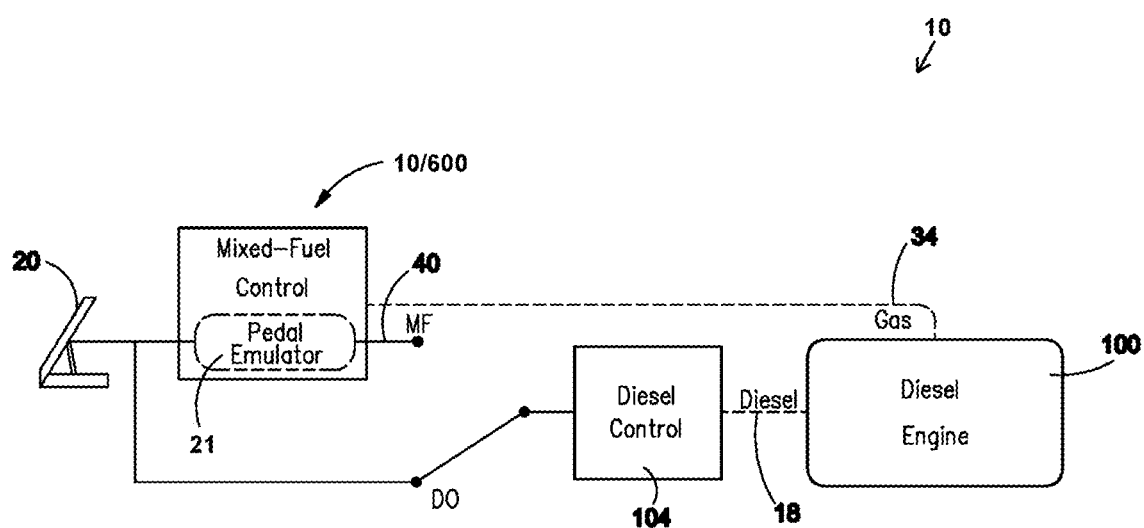
FIG. 1—Pedal Emulator Interface
FIG. 2—Remote Pedal Emulator Interface
FIG. 3—Torque Speed Command
FIG. 4—Vehicle Cruise Control Emulator
FIG. 5—Emissions Feedback Control
FIG. 6—EGR Emulator
FIG. 7—After-treatment Protection
FIG. 8—EGR Emulator Schematic
FIG. 9—Manifold Air Pressure Schematic
FIG. 10—Manifold Air Pressure Schematic
FIG. 11—Virtual Governor Schematic

The present invention preserves the most cost effective means for integrating a mixed fuel system 10 with an application internal combustion engine 100. The internal combustion engine 100 includes serial bus 16, diesel fuel control 104, exhaust gas recirculation 200, diesel oxidation catalyst 300, diesel particulate filter 400 and selective catalytic reduction 450 after-treatment subsystems 500. The mixed fuel system 10 includes an electronic controller 600 (also described as a Dual fuel controller, electronic control module), sensors 14, and serial bus 16 communications with the internal combustion engine controller 12, as well as gas regulation components appropriate for fumigation-based control.

The controller 600 may comprise a ruggedized engine control module. The embedded electronic controller is capable of operating in harsh automotive, marine, and off-highway applications. It's hardware features wide-ranging input and output functionality and microprocessor(s) which are pre-programmed and calibrated with a highly customized control strategy. An onboard floating point processor with high clock frequency allows complex control software to run efficiently. Dual and/or fixed-point processors may also be employed for safety, redundancy and/or cost savings. Integrated serial communications data-links ensure interoperability with other system components.

In addition, the present invention also incorporates methods and apparatus necessary for achieving independent diesel fuel control as well as exhaust gas emissions control. The present invention facilitates including monitoring and/or controlling exhaust gas recirculation (EGR) 200 emulation, protecting diesel oxidation catalyst (DOC) 300, monitoring a diesel particulate filter (DPF) 400 and includes a selective catalytic reduction (SCR) 450 after-treatment subsystem 500.

Pedal Signal Emulation:

One preferred approach to diesel demand limiting comprises: accelerator pedal signal 21 emulation. This mechanism limits diesel consumption by stemming driver demand 22 and is shown in FIG. 1.

In diesel only mode, the accelerator pedal signal 21 is passed directly through to the diesel 100 ECM 600. The pedal input 20, 21 is combined with other control signals (e.g. engine speed) as the basis for a diesel fuel map 26 to the engine 100. Particularly in the case of a so-called "min-max" electronic governor, the fuel command is proportional to the magnitude of the pedal input 21 itself. Thus, the driver 28 indirectly commands diesel fuel 18 to the engine 100 via the accelerator pedal 20.

Figure 4:
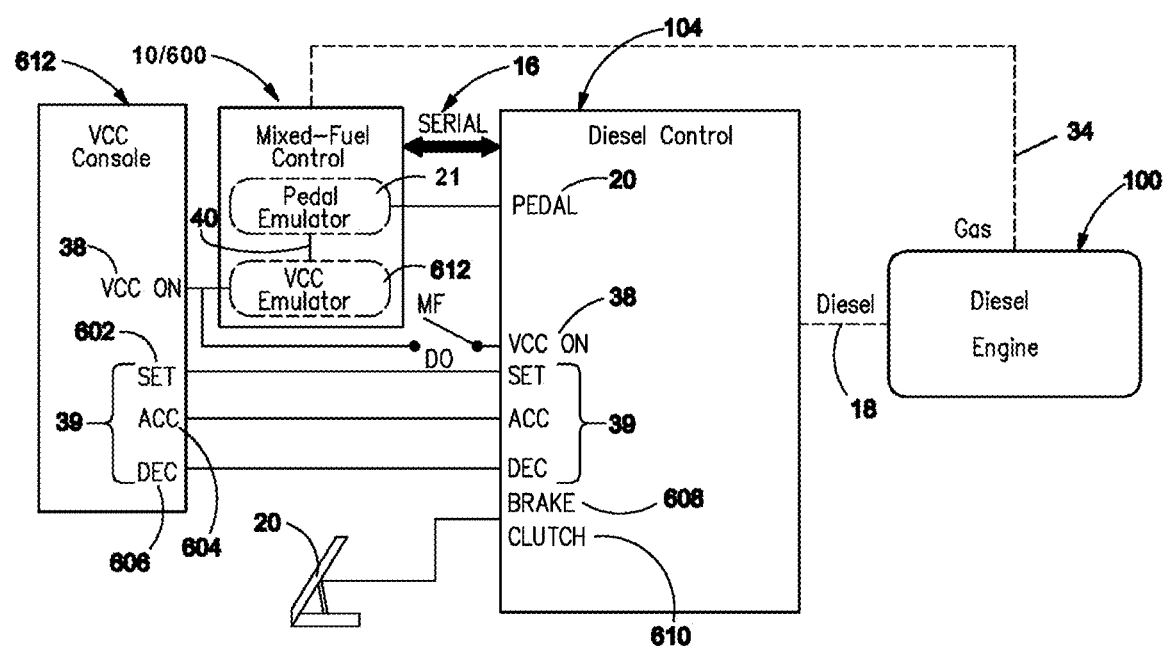

In mixed fuel mode, the accelerator pedal signal 21 is first processed through the mixed fuel control system 10. The system 10 of the present invention intercepts and electrically emulates the accelerator pedal signal 21 to create an emulated pedal signal 40 to reflect a lower level of diesel demand 36 from the driver 28. This allows a secondary fuel 34 (e.g. natural gas) to be mixed with diesel 18, therefore allowing maximum fuel economy without overpowering the engine 100. The emulated pedal signal 40 can also be used to control diesel demand 36 during Vehicle Cruise Control 38 operation as depicted in FIG. 4. (see FIGS. 1 and 4)

Emulation of the pedal signal 40 may involve several different electrical interfaces, including single analog throttle position sensor (TPS) signal; dual analog TPS signal; and a single PWM signal. The pedal signal 21 in any format is intercepted and then modified to reflect a diminished diesel demand 36 during the mixed fuel mode of operation. Modification can be achieved through any of several means. The appropriate selection depends on the signal format.

The modification may be made to employ a simple voltage divider 52. However, this modification changes pedal feel. It also will not work with PWM (Pulse Width Modulation) input and will not allow for VCC 38 (Vehicle Cruise Control) operation. Further, it may not satisfy modern on board diagnostic (OBD) checks. Alternatively, the modification may comprise a Simple Zener diode 52a. Once again, the Simple Zener diode changes pedal 20 feel, effects no Pulse Width Modulation, and does not work with Vehicle cruise control 38. Further, this modification cannot satisfy modern on board diagnostic checks.

Analog input and analog output drivers are also possible modifications, however, they are a relatively expensive solution, and may not handle PWM signal input. As an alternative, analog input combined with Pulse Width Modulation output driver with impedance matching is, generally, the best solution for single/dual analog. This arrangement handles Vehicular cruise control 38 and on board diagnostics checks.

Finally, Analog/Digital input combined with Schottky trigger, TPU (Time Processor Unit) and Pulse Width Modulation output driver is considered by the inventors to comprise a preferred solution for Pulse Width Modulation and the combination handles Vehicular Cruise Control 38 and on-board diagnostics. The TPU is a microprocessor which counts/captures digital events such as pulses over a given time period. In the case of a PWM signal, there are on/off digital pulses modulated with a certain duty cycle and frequency. A TPU is required to process the signal Diesel engine 100 electronic control module 12 self-test and diagnostic criteria for the throttle position sensor (TPS signal) are also satisfied by the emulated signal output 40. For failsafe reasons, the accelerator pedal signal 21 is switched to the emulated signal 40 using a normally-closed (NC) dual-pole single throw (DPST) relay. Any mixed-fuel component failure will pass the accelerator pedal signal 21 through NC contacts to the diesel ECM 600 and fully restore operation to diesel-only mode.

Figure 2:
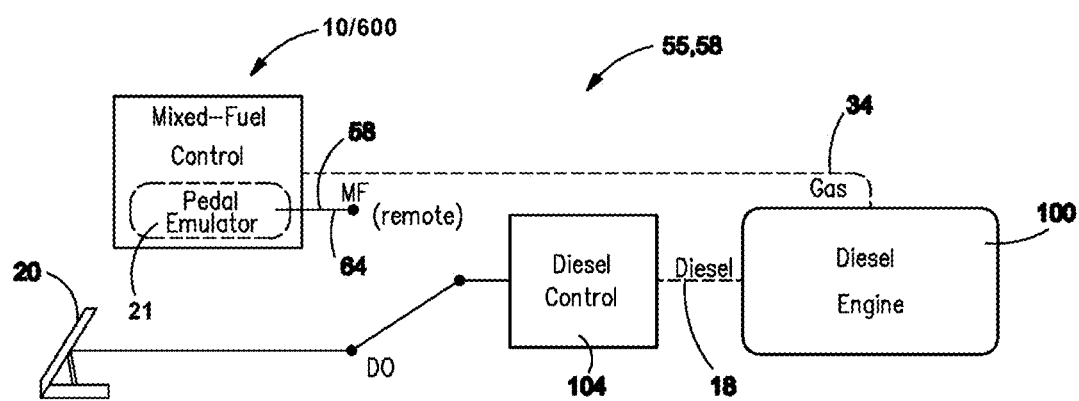

Remote Pedal Interface:

A second preferred approach to diesel demand limiting involves bypass of the primary accelerator pedal 20 input 21 through a remote pedal interface 58 is depicted by FIG. 2. Since some engine ECMs 12 are designed to allow for remote pedal 57 operation (e.g. for work-truck applications), activated by a separate switch or jumper input, diesel demand limiting can be achieved without interrupting and processing the primary pedal input 21.

In diesel-only mode, the driver commands diesel fuel 22 to the engine 100 via the accelerator pedal 20. In mixed fuel mode, the remote accelerator pedal signal 64 instead originates from the mixed fuel control system 10. The mixed fuel control system 10 may comprise controller 600, sensors 14, serial bus 16, communications with the engine controller 12.

The present invention monitors the primary pedal input 21 level through the ECM 12 serial bus 16 connection and electrically emulates the accelerator pedal signal 21 to reflect a lower level of diesel demand 36 sent from the remote pedal 55 input 64. As with the first approach, this allows secondary fuel 34 (which may comprise natural gas) to be supplied to the engine 100 with diesel 18, therefore allowing maximum fuel economy without overpowering the engine 100.

The remote accelerator pedal 55 signal 58 must accommodate the interface requirements of the diesel ECM 12 in order to satisfy self-test and diagnostic criteria. For failsafe reasons, the accelerator pedal signal 21 is switched to the emulated output signal 40 using a separate digital output from the dual fuel ECM 600. Any component failure in the mixed-fuel system 10 will return the primary accelerator pedal signal 21 to the diesel ECM 12 and fully restore operation to diesel-only mode.

Using the remote pedal input 55, 58 and emulation of VCC operation 38, diesel 18 demand can be directly controlled by the mixed fuel controller 600, allowing significant substitution of a secondary fuel 34. This is the preferred embodiment for engines equipped with a secondary, remote pedal input and networked through J1708/J1587 serial or proprietary CAN busses.

Figure 3:
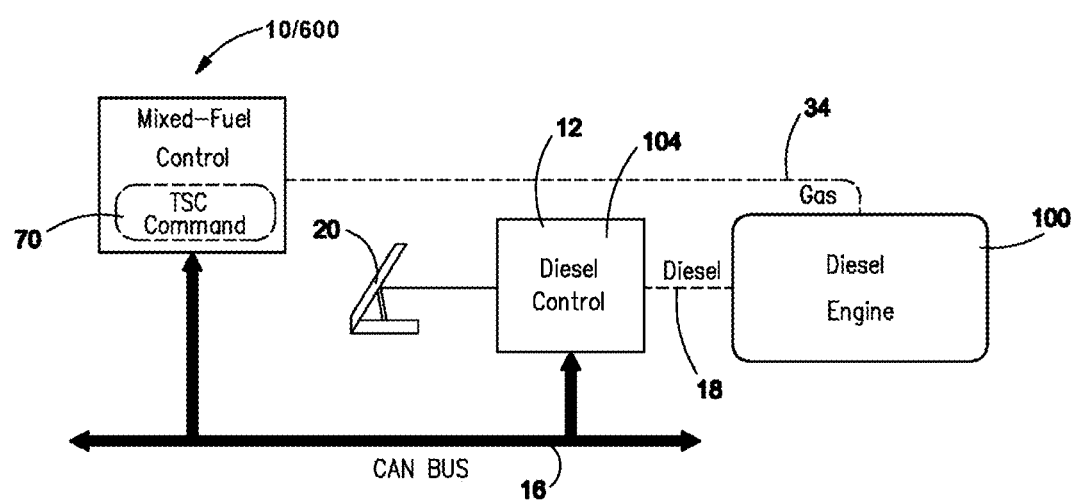

Torque Speed Command:

A third, and most preferred method for diesel demand limiting involves direct control of the engine 1 using the J1939 Torque Speed Command (TSC) interface 70. The TSC interface 70 allows the engine torque and/or speed to be limited and/or controlled by an externally networked device, in particular the mixed fuel controller 600. For J1939 capable engines, this method allows the mixed fuel ECM 600 to substitute the secondary fuel 34 in place of diesel 18 in a highly controlled manner and manage engine torque and/or speed during all modes of engine operation. A similar command interface is also available and may be utilized for certain proprietary CAN busses. FIG. 3

During diesel only operation, the mixed-fuel system 10 does not send any torque speed command 70 over the CAN bus 16, and therefore does not limit or control engine torque. Once mixed-fuel mode is active, the controller 600 sends the torque speed command 70 in accordance with the J1939 specification, thereby enabling control over engine torque and/or speed. This, in turn, gives the mixed-fuel ECM 600 independent control over diesel fuel consumption, irrespective of whether the driver or VCC 38 is governing engine speed and/or acceleration.

If an automatic transmission shift or traction control event (etc.) occurs during mixed fuel operation, the engine ECM 12 itself will arbitrate any transient conflict in TSC 70 commands. In either case, the mixed fuel system 10 will revert to diesel-only mode for any remaining duration of the event.

Vehicle Cruise Control:

The apparatus required for emulation of vehicle cruise control 38 functionality within the mixed fuel system 10 is shown and described by FIG. 4. During VCC operation and in mixed-fuel mode, the diesel fuel 18 is controlled by the electrically emulated pedal signal 40 while natural gas 34 is controlled by a variable flow control valve such as an electronic throttle body (ETB) 75. The overall fuel demand is controlled by the emulated VCC function 38, 40 while the resulting gas substitution ratio (GSR) is defined by fuel tables which are optimized for fuel economy, engine performance, emissions, etc. Details are described below.

The VCC 38 is operated by on/off switch 39 which is electrically interrupted and monitored by the mixed fuel controller 10. During diesel-only operation, the state of that switch 39 is passed through to the diesel ECM 12, allowing for normal VCC 38 operation. In mixed-fuel mode, the state of the switch 39 is emulated by the dual fuel controller 600 and passed through in an "off" state, preventing the diesel ECM 12 from activating the internal VCC 38 function.

Instead, with the physical VCC on/off switch 39 in the "on" state, the dual fuel controller 600 emulates the VCC 38 function for effective mixed fuel operation. To accomplish this, the dual fuel ECM 600 must also monitor the state of all other VCC 38 control inputs (e.g. "set 602," "accel," 604 "decel," 606 etc.) as well as driver inputs (e.g. brake 608, clutch 610) and vehicle speed using the serial bus 16 (e.g. J1587) connection.

Thus, when the driver presses the VCC 38 switch 39 to "set" 602, the current vehicle speed is captured as a VCC control set-point. Any deviation from that set-point results in a speed error signal. Based on the sign and magnitude of that error over time, a dual-fuel VCC 38 feedback controller 612 generates an increasing, decreasing or constant overall fuel demand. Note that the dual-fuel VCC controller 612 responds similarly to an "accel" or "decel" input from the driver.

The resulting, overall fuel demand is then satisfied by a fuel mixture 18/34 employing a gas substitution ratio which is defined through a fuel map 26 in the dual-fuel ECM 600. In turn, this gas substitution ratio (GSR) is optimized for fuel economy, engine performance and exhaust gas emissions. The diesel portion of the fuel demand is processed by the emulated pedal signal See FIGS. 1 and 2 for related details. The natural gas (secondary fuel 34) demand is controlled by the variable flow valve which may comprise the ETB 75. The exhaust gas emissions, E.g. NOx, are monitored using existing sensors and the CAN bus or sensors specific to this task, thereby providing means for real time control and adjustment of gas, secondary fuel, and air to adjust and manage emissions via the ECM 600 and EGR 200.

Should the driver cancel or otherwise interrupt VCC 38 operation by tapping the brake, depressing the clutch, etc., the dual fuel ECM 600 will revert to pedal operation but remain in mixed-fuel mode. Any mixed-fuel component failure will pass the VCC 38 on/off signal through digital output to the diesel ECM 12 and fully restore operation to diesel-only mode.

By monitoring all VCC 38 control inputs and assimilating all control outputs, the present invention allows the dual fuel ECM 12 to emulate entirely the VCC function 40 through use of an optimal fuel mixture 22, 34. Status lamps on the instrument panel may also be controlled through the applicable serial bus 16. Without this invention, gas substitution, and therefore fuel economy, emissions performance, etc. are completely constrained by the diesel ECM 12 speed governor.

Feedback Control of Combustion, Exhaust Gas Recirculation

Figure 5:
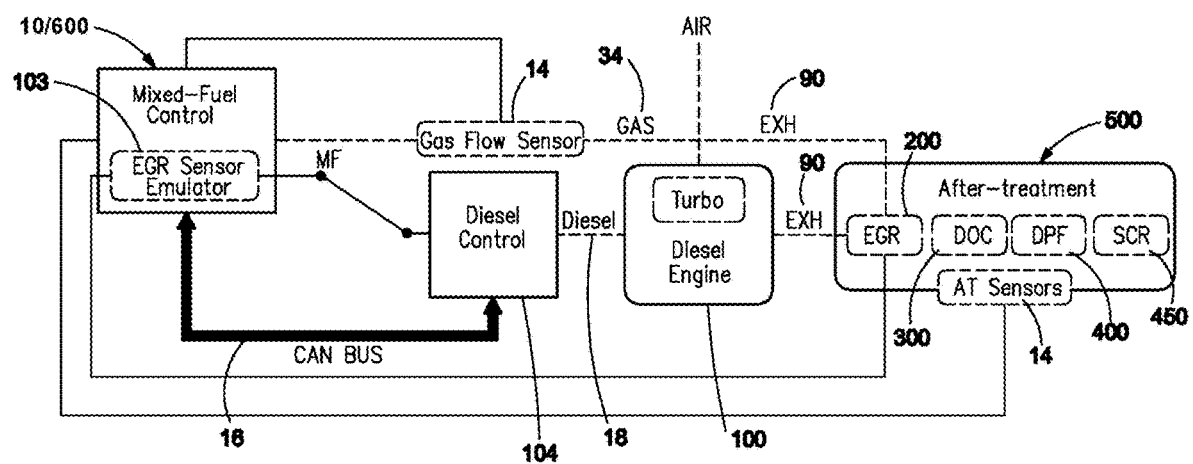

For feedback control of the combustion process, with improved fuel economy and emissions performance as control objectives, the present invention monitors the diesel engine, gas train and after-treatment system 500. Engine data 82 is acquired through the diesel ECM serial bus 16 as depicted in FIG. 5 or through direct engine sensing of at least some of the following parameters: Engine speed; Engine load (e.g. manifold air pressure, external load sensor, etc.); Pedal position 20, 21 or governor demand input; and Diesel fuel consumption. Though not all depicted in FIG. 5, gas train sensing measurement and devices may also include: Tank pressure as applicable; Regulator pressure; Gas temperature; Gas fuel consumption either directly or indirectly through: gas-compatible hot-wire anemometer; differential pressure sensor; Coriolis flow meter; gas flow estimation.

The dual fuel system 10 also monitors exhaust gas emissions 90, either through the diesel ECM 12 and/or after-treatment (AT) 500 control module serial bus connection, or through direct sensing of one or more of the following: $NO_x/O_2$ concentration level via CAN-based Smart Sensor or Standalone $O_2$ sensor along with Exhaust Gas Temperatures (EGTs) and pressure.

Figure 6:
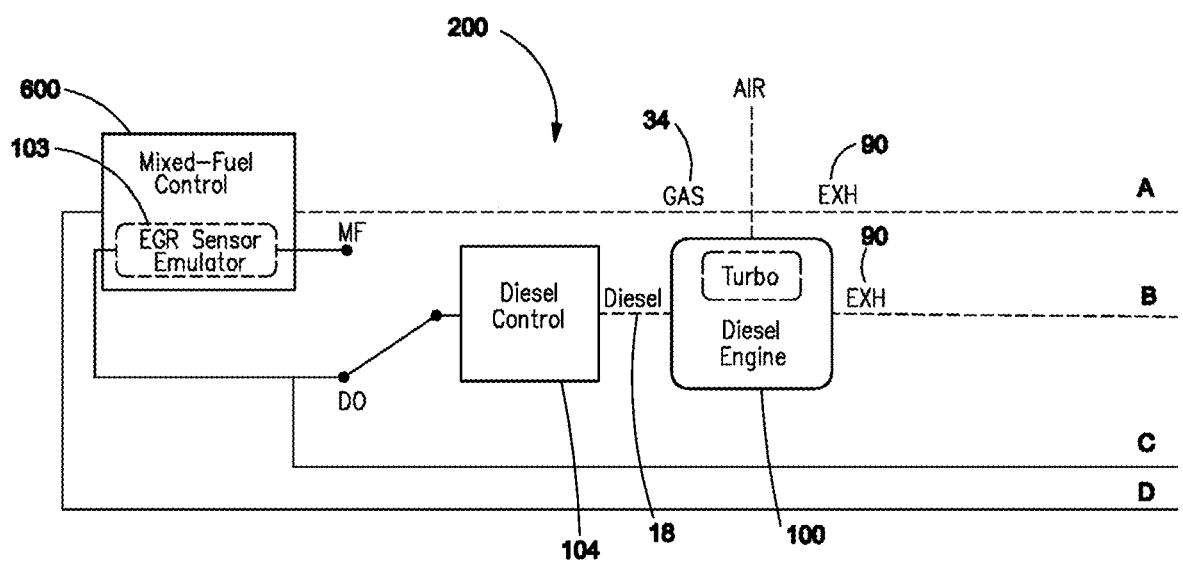

Importantly, the present invention not only monitors the combustion process, but also independently controls both primary 18 and secondary 34 fuel sources as well as oxygen content through exhaust gas recirculation (EGR) 200. Control over diesel demand is described through FIGS. 1-4 with the CAN-based TSC command 70 implicit within FIG. 5. Gas flow control is achieved through a variable flow valve (not shown) while EGR 200 emulation is depicted in FIG. 6.

While prior art systems do claim to improve exhaust gas emissions through the combustion of natural gas in the fuel mixture, these systems do not actively monitor or control emissions content. Instead, the present invention controls diesel demand, gas flow and exhaust gas recirculation, all while monitoring exhaust gas conditions, for the purpose of optimizing both fuel economy and emissions performance. In summary, this basic responsiveness to emissions performance in addition to lifecycle cost savings is at the core of the novel control system.

Exhaust emission 90 in general, and PM (particulate matter) 95 in particular is further impacted by the use of exhaust gas recirculation (EGR) 200 valves, which are intended to reduce $NO_x$. Most diesel engines ECMs 12 control the EGR 200 in an open-loop manner based on a combination of diesel fuel injection pulse width, engine load and engine speed. However, since the combustion of natural gas 34 reduces the need for diesel fuel 18, the engine ECM 100 perceives reduced engine load and therefore increases EGR 200 as described above to reduce $NO_x$. This increase in exhaust gas 90 to reduce NOx leads to limited supply of fresh oxygen for complete combustion of the total fuel mixture, a related loss in overall fuel efficiency and a marked increase in soot production.

The elevated soot levels increase service demand for regeneration of the diesel particulate filter (DPF) 400 and also lead to possible DPF 400 failure. These problems are exacerbated by the introduction of SCR after-treatment systems 500, which are inherently more responsive to NOx production and concentration. The contemplated invention solves this problem by actively controlling the EGR 200 during dual fuel operation. Referring now to FIG. 6, EGR 200 control is achieved through manipulation of one or more of five signals to the diesel engine ECM 12: EGR valve position 101, barometric pressure, EGR differential pressure, intake Manifold pressure, and intake Manifold temperature.

Any or all of these signals is intercepted by the ECM 12 and then emulated as depicted in FIG. 6 to reflect the expected, diesel-only EGR level. Modification can be achieved through the following means which may include analog input and analog output drivers; and analog input and PWM output driver with impedance matching.

Diesel ECM self-test and diagnostic criteria for the EGR sensor signal 103 itself are also satisfied by the emulated signal output. For failsafe reasons, the EGR signal 103 is switched to the emulated signal using a normally-closed (NC) dual-pole single throw (DPST) relay. Any mixed-fuel component failure will pass the EGR sensor signal 103 through NC contacts to the diesel ECM 12 and fully restore operation to diesel-only mode.

Through active EGR 200 control, $NO_x$ concentration is maintained at or below diesel-only levels while soot production may be reduced by a factor of five or more. Less soot reduces the need for DPF 400 regeneration and therefore fuel consumed for after-treatment. Less soot also extends the useful life of the DPF 400 itself.

Figure 7:
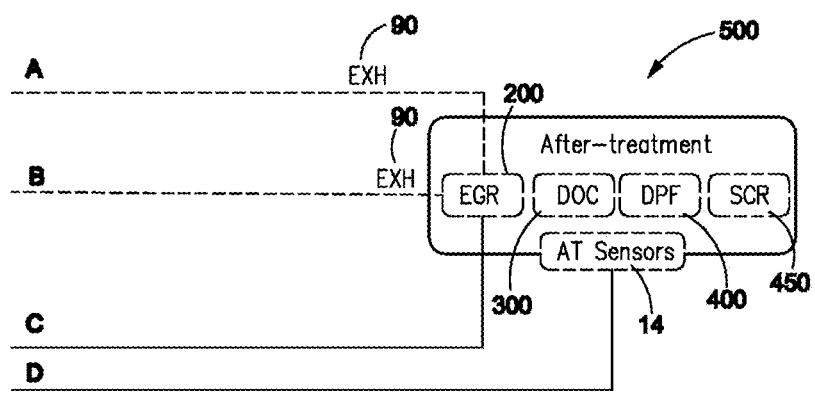
Figure 8:
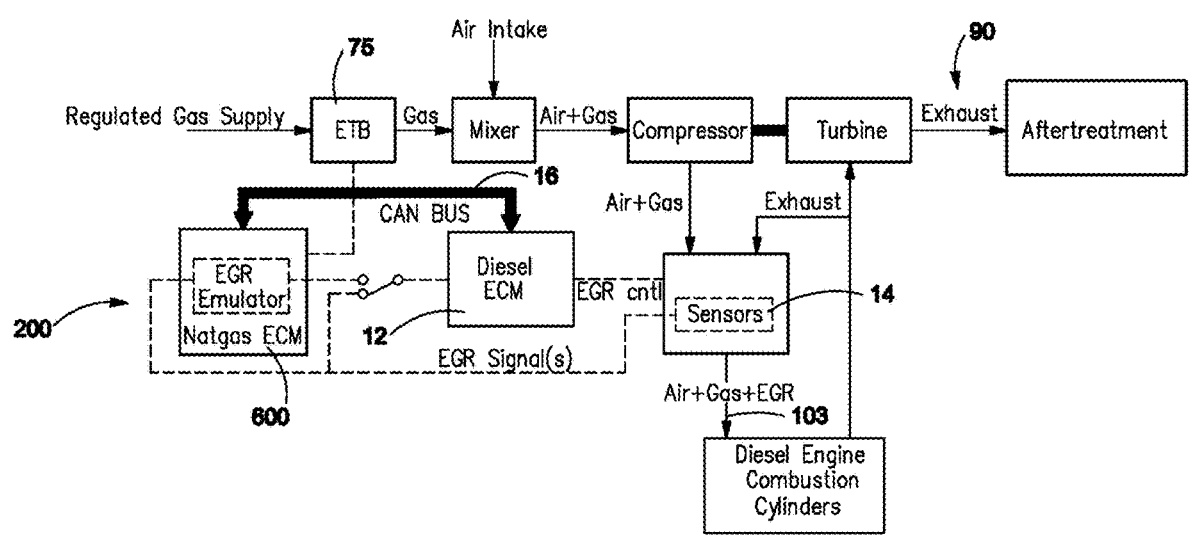

But, even with active EGR 200 control, the diesel oxidation catalyst (DOC) 300 and diesel particulate filter (DPF) 400 should be protected during dual fuel operation. In addition to the potential soot load increase from dual fuel operation, most after-treatment systems regenerate the DPF 400 in part based on diesel fuel 18 consumption over time. Since the diesel fuel 18 consumption rate is reduced even though overall fuel consumption is not, the DPF 400 may not be adequately protected from soot build-up. Therefore, the present invention employs a strategy to protect the DPF 400 by actively monitoring DPF 400 differential pressure 402, temperature and regeneration status, either through direct sensing 14 as shown in FIG. 7 or through serial bus communications as is known in the art.

Protective measures to guard the DPF 400 include the following methods: Monitoring excess soot accumulation through DPF differential pressure 402, differential rate of change and/or the DPF status indicator; restoring diesel-only operation when the DPF status indicates regeneration is required or if differential pressure is deemed excessive for gas operation; upon indication of excess soot load on the DPF 400, prevention of gas operation until regeneration process is complete; Significantly reducing combustion of gas at elevated DOC 300 temperatures indicative of passive regeneration; and preventing combustion of gas during any DPF 400 active regeneration process.

All of these protective measures serve to extend the life of the after-treatment components and reduce lifecycle costs associated with dual-fuel operation.

By way of background, some engine control modules (ECMs), for example, diesel ECMs have advanced emissions controls & diagnostics which perform plausibility checks to assure proper engine operation and regulatory compliance. When these checks are not satisfied, a fault condition is set and the engine may be de-rated or even shutdown. As an example of such a diagnostic check, a diesel engine ECM may compare the measured value for a manifold air pressure (MAP) with an expected value for the MAP. The expected value may be based on certain operating conditions, such as diesel fuel consumption rate, engine speed, engine load, intake temperature, etc. Sufficient aberration of the measured MAP signal from the expected value results in a diagnostic failure response.

Some artisans have sought to modify engine systems so that a second fuel, for example, natural gas, may be provided with a primary fuel, for example, diesel fuel, to an engine. The inventor discovered these types of modifications are problematic with engine systems having an ECM configured to perform the above mentioned plausibility checks since the ECMs are not able to sense directly the flow of the secondary fuel into the engine. That is, the expected MAP calculated by the engine ECM may be different from the measured MAP since the ECM calculates the expected MAP based on diesel fuel only instead of the mixed fuel. Thus, during dual fuel (DF) operation, the above mentioned diagnostic checks may operate with incomplete information. As such, when the engine is in DF mode, the ECM may expect a relatively lower manifold air pressure consistent with a diminished diesel fuel consumption at a given operating condition. Because the measured MAP signal reflects the presence of the total fuel mixture, the sensed intake MAP may be higher than expected. Even though the MAP is normal given the total fuel consumption rate, the perceived implausibility may trigger a fault under those specific operating conditions.

Figure 9:
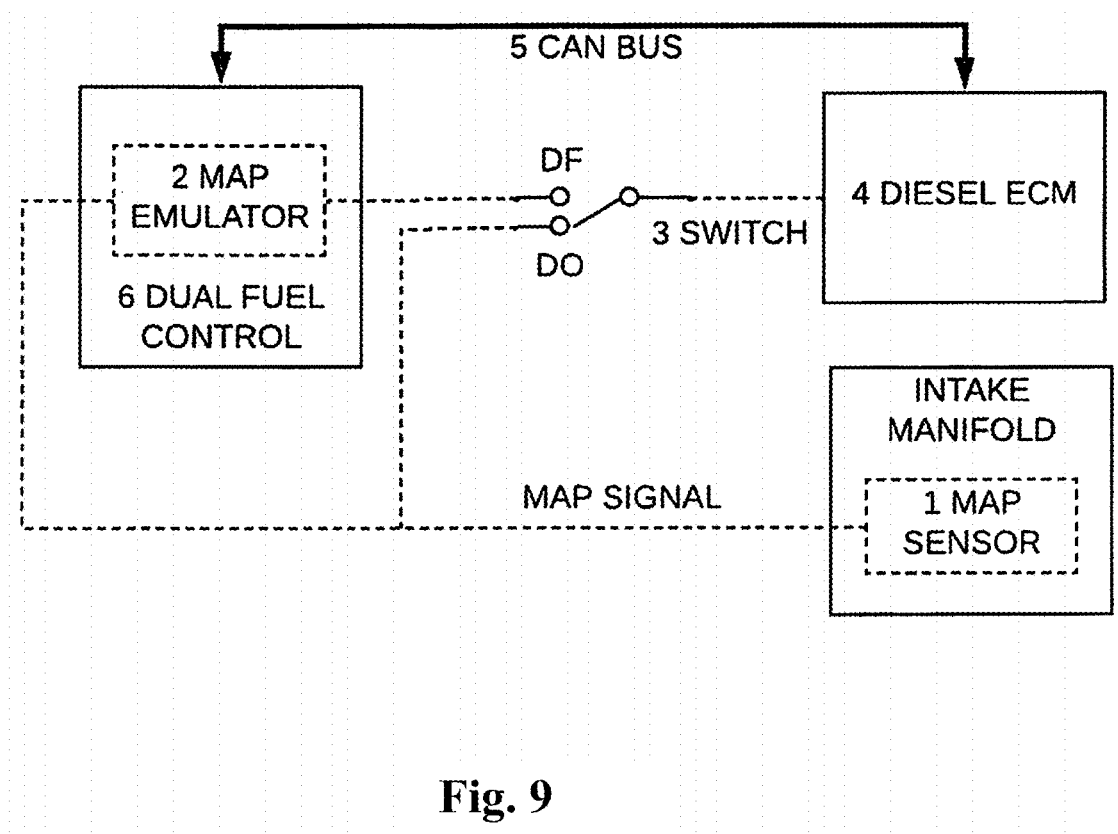

To address the above problems, the inventor designed a system with a novel dual fuel controller 6 which creates an emulated voltage for input to an ECM 4 during DF operation. More specifically, as best illustrated in FIG. 9, the system includes an engine ECM 4 (for example, a diesel ECM), the dual fuel controller 6, a switch 3, an intake manifold, and a MAP sensor 1 which sends a signal indicative of the MAP. The dual fuel controller 6 controls both the primary fuel, for example, diesel fuel, and the secondary fuel, for example, natural gas, to an engine. Consistent with the earlier described embodiments, the dual fuel controller 6 indirectly controls diesel fuel through the means (i.e. diesel demand limiting) described in the previous paragraphs. In this embodiment, the system of FIG. 9 monitors and emulates the MAP signal so that it mimics diesel-only operation for the appropriate operating condition and without any degradation in engine control.

Referring to FIG. 9 the dual fuel system monitors and emulates the MAP sensor 1 signal through use of a bypass circuit. The bypass circuit utilizes the switch 3 such that, in diesel-only (DO) mode, the MAP sensor 1 is connected to the ECM 4 as well as to the dual fuel controller 6. In dual-fuel (DF) mode, the emulated MAP signal (i.e. from the dual fuel controller 6) is connected to the ECM 4 so that the emulated MAP value is plausible. Details for MAP sensor emulation 2 are described below and depicted in FIG. 10 that follows.

Figure 10:
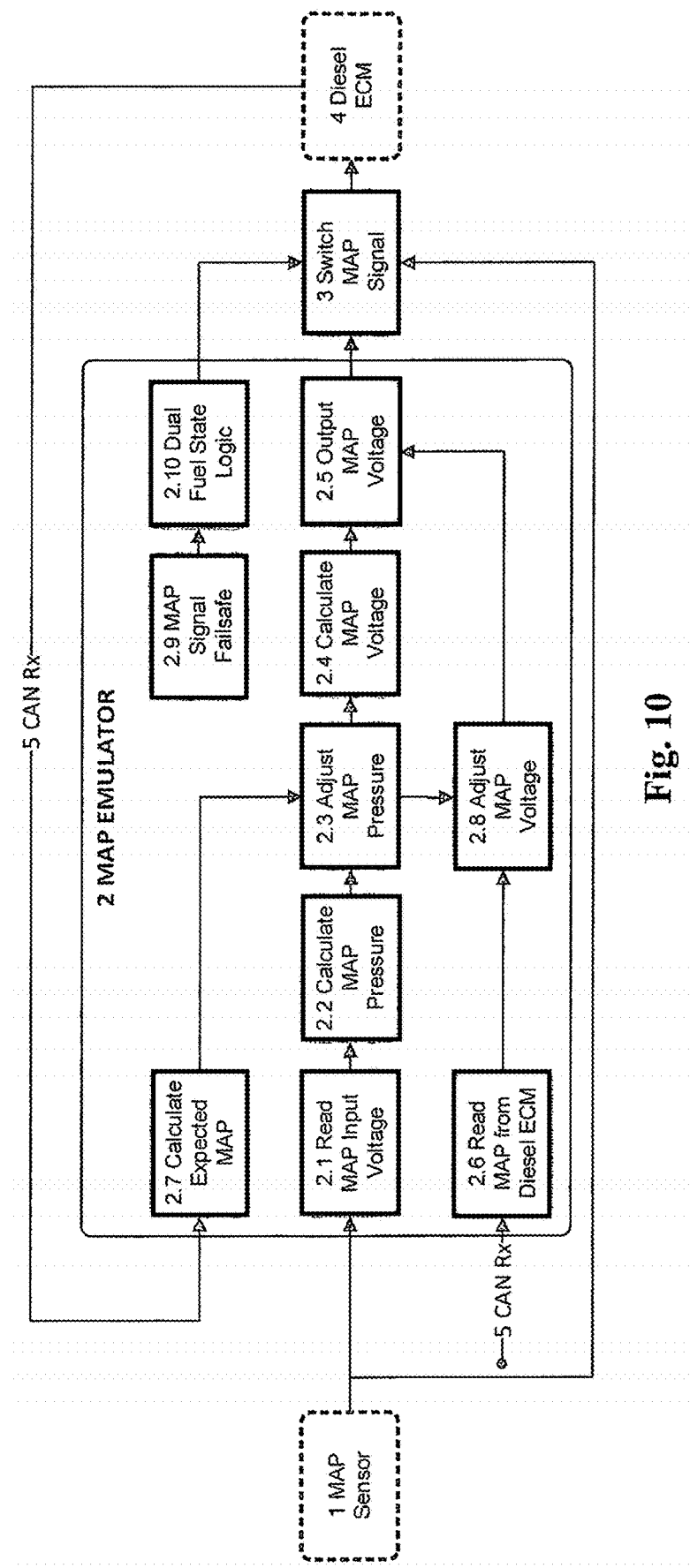

In the nonlimiting example of FIG. 10, the dual fuel controller 6 reads input voltage 2.1 from the MAP sensor 1 using an analog-to-digital converter. The dual fuel controller 6 then calculates MAP pressure 2.2 from sensor input voltage. In one example, the dual fuel controller 6 calculates the MAP pressure 2.2 using a calibration table that is stored in memory of the dual fuel controller 6. The memory, for example, may be some sort of chip, for example, ROM or nonvolatile memory chip, in the dual fuel controller 6. The calibration table may be stored in the dual fuel controller and in memory. For example, the calibration table may be stored in the dual fuel controller's micro-processor, for example in volatile or non-volatile memory random access memory (i.e. NVRAM). In another embodiment, an equation may be used to calculate a MAP pressure 2.2 where the input of the equation is the voltage and the output is pressure. In this nonlimiting example embodiment, the calibration table may be a one dimensional look up table. The calibration values can be derived through a priori information (e.g. from sensor specification data) or through online learning during diesel-only mode of operation. The latter method correlates sensor input voltage readings from 2.1 with MAP pressure values 2.6 from the ECM 4 as read via the CAN bus 5 input. That is, in this latter embodiment, the ECM 4 calculates the MAP which is shared with the dual fuel controller 6 by the CAN bus 5.

To compensate for the presence of a secondary fuel, the dual fuel controller 6 compares the actual MAP pressure 2.2 to an expected value 2.7 MAP pressure and adjusts the MAP pressure signal output 2.3 to match diesel-only operation. The expected MAP pressure 2.7 is itself a function of the engine operating condition (e.g. engine speed, diesel fuel consumption rate, intake air temperature, etc.) and is stored in a multi-variate look-up table, which may be stored in a nonvolitile memory chip of the dueal fuel controller 6. The dual fuel controller 6 determines the appropriate MAP value by reading engine parameters for the current operating condition through the CAN bus (5) input. This allows the dual fuel controller 6 to calculate and output a plausible value to the ECM 4 during dual fuel operation, thus avoiding any diagnostic fault conditions.

The dual fuel controller 6 uses the adjusted MAP pressure 2.3 to calculate an associated MAP output voltage 2.4 from the calibration table stored in memory. The controller outputs MAP signal voltage 2.5 using either an analog voltage output or by approximating an analog voltage with a pulse-width modulated (PWM) digital output. In one embodiment the dual fuel controller 6 utilizes a pulse-width modulated (PWM) output with requisite signal conditioning to filter the PWM voltage.

The emulated signal voltage output from the dual fuel controller 6 must fall within the allowable diagnostic range of the ECM 4, typically above 0.5 volts and below 4.5 volts. Within the 0.5V-4.5V range, the emulated signal must also reflect a value that is physically consistent with the intake MAP.

In DF mode, the dual fuel controller 6 electrically disconnects the MAP sensor 1 output from the ECM 4 and connects the emulated MAP signal through the switch 3 to the ECM4 MAP sensor input. The switch 3 may be internal to or external to the dual fuel controller 6 and connects/disconnects the physical MAP sensor circuit without creating an electrical discontinuity fault at the Diesel ECM. One embodiment utilizes a dual pole single throw (DPST) relay, in which the MAP sensor 1 is connected directly to the Diesel ECM when the relay is not energized. This allows for failsafe operation should the Dual Fuel System be turned off or otherwise disabled.

In lieu of the actual MAP sensor reading, the ECM 4 may measure the emulated MAP signal from the dual fuel controller 6 and communicate the adjusted measurement via the CAN bus (5). Feedback from the CAN bus 5 allows the dual fuel controller 6 to monitor both the emulated signal processed through the ECM 4 input as well as the MAP sensor 1 connected directly to the dual fuel controller 6 analog input.

In dual fuel mode, the dual fuel controller 6 monitors the emulated MAP value 2.6 communicated from the ECM 4 and compares that value to the adjusted value 2.3 derived from diesel-only operation. The dual fuel controller 6 may then adjust MAP signal voltage 2.8 by varying the PWM duty cycle so that the value reported by the ECM 4 matches the expected value for MAP pressure.

The dual fuel controller failsafe Logic 2.9 continuously monitors the actual MAP sensor 1 input to ensure that the manifold air pressure remains within a normal and safe range during dual fuel operation. Any MAP pressure 2.2 reading outside of the allowable range triggers the Dual Fuel State Logic 2.10 to restore diesel-only operation. The switch 3 then reconnects the actual MAP sensor to the Diesel ECM.

The dual fuel controller failsafe Logic 2.9 also monitors the adjusted voltage output 2.8 to assure accurate MAP signal compensation. If a persistent MAP signal discrepancy cannot be compensated, the failsafe logic triggers dual fuel state logic 2.10 and restores diesel-only operation. Here again, the switch 3 reconnects the MAP sensor 1 to the ECM 4.

Consider the following example, where the actual MAP pressure reading in dual fuel mode is (e.g.) 20 PSI but in DO mode with only diesel fuel consumption, MAP would read 15 PSI.

At 2.1 The dual fuel controller 6 reads MAP sensor voltage input of 3.0V (corresponding to 20.0 psi)

2.2 The dual fuel controller 6 converts this MAP measurement to 20.0 PSI. The conversion from voltage to pressure is based on (e.g.) sensor data and using a look up table.

2.7 The dual fuel controller 6 calculates the expected MAP value in DO mode at 15.0 PSI. This is based on stored CAN data for the engine operating condition.

2.3 The dual fuel controller 6 compares the measured value to the expected value and adjusts the emulated pressure output to 15.0 PSI

2.4 The dual fuel controller 6 converts the emulated pressure of 15 PSI back to a voltage of 2.5 V, again based on the "inverse" sensor characteristic

2.5 The dual fuel controller 6 outputs 2.5V to the ECM 4 via PWM voltage output. The ECM 4 reads the 2.5V signal and interprets it as 15.1 PSI—slightly higher than the intended pressure value of 15.0 PSI (5) The ECM 4 sends the 15.1 MAP pressure reading via CAN to the dual fuel controller 6.

2.6 The dual fuel controller 6 reads the MAP pressure via CAN as 15.1 PSI, which is slightly above the "command" value.

2.8 The dual fuel controller 6 adjusts the PWM voltage output so the value reported from the ECM 4 via CAN identically matches the command value of 15.0 PSI

2.9 The dual fuel controller 6 has failsafe protection in case the actual value of MAP is too high in DF mode or the PWM voltage cannot compensate the command value correctly.

Controlling a dual fuel system is not limited by the aforementioned improvements and inventions. For example, FIG. 11 describes another inventive concept, a virtual dual fuel governor, useful for controlling a dual fuel system.

In the conventional art, diesel engines commonly employ an electronic governor function that controls fuel injection to the engine so as to achieve a certain control objective (e.g. engine speed) in the presence of an external load disturbance. Within a vehicular application, the governor function generally relates driver demand (e.g. pedal position, vehicle cruise control set speed, etc.) to a desired fueling quantity while also taking into account various engine operating parameters such as engine speed, manifold air pressure (MAP), manifold air temperature (MAT), etc. Diesel governor control objectives are selectively emphasized based on governor type (e.g. "min-max," "full-range," "load-based speed control," "idle," "PTO governor," "cruise control," etc.). In turn, governor type may be selected automatically or through explicit user input, such as through push-buttons on the instrument panel or through a service diagnostic tool interface. Specific governor types generally employ a set of feed-forward control parameters stored in a multi-dimensional fuel/map and or as part of a feedback control loop such as proportional-integral (PI) control gains. In order to control a mixture of fuels to the diesel engine during any and all of the above modes of operation, a virtual dual fuel virtual governor may be embodied as an augmented representation of the diesel fuel governor. This virtual dual-fuel governor replicates the function of diesel governor but instead blends the fuel mixture by limiting diesel injection and substituting an energy-equivalent amount of a secondary fuel, for example, natural gas.

In example embodiments, the virtual dual fuel governor (VG) maintains control objectives commensurate with those of the diesel governor: performance, fuel economy & efficiency, emissions, combustion quality, etc. These objectives allow the dual fuel system to match the torque and power specification of the OE diesel engine but with improved fuel economy and emissions made possible through the introduction of the secondary fuel.

Figure 11:
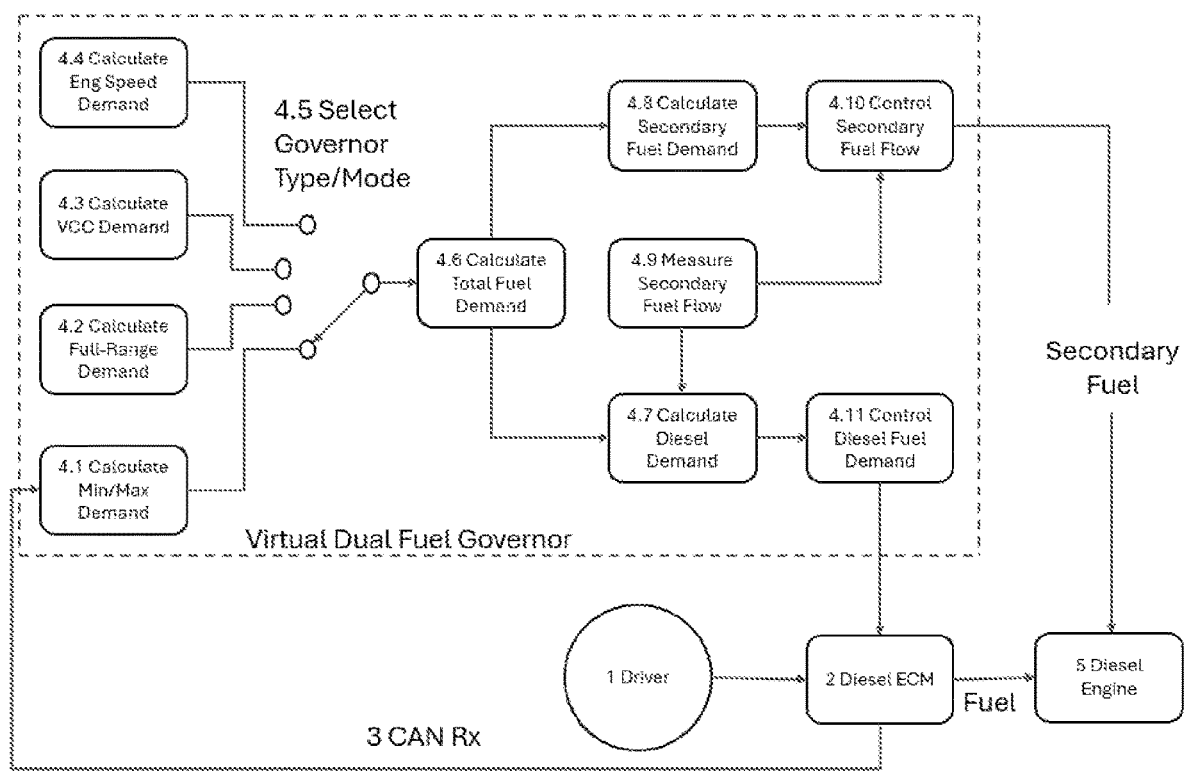

In one embodiment, and referring to FIG. 11, the virtual dual fuel governor (VG) reads driver demand (1) inputs from the diesel ECM (2) via the vehicle Controller Area Network (3) Bus. In addition to driver demand inputs (e.g. pedal position, VCC set speed, etc.), the VG receives CAN data that represents engine operating parameters such as engine speed, diesel fuel consumption rate, MAP, MAT, etc.

In the same manner in which the diesel governor functions, the virtual dual fuel governor (VG) also stores a series of multi-dimensional fuel maps and control parameters (i.e. 4.1, 4.2, 4.3 and 4.4) in non-volatile memory, each associated with a particular governor type. Each fuel map allows calculation of a total fuel demand given a specific set of operating conditions.

For example, the default "min/max" governor type (4.1) allows the driver to control total fuel demand directly via pedal position when the engine is operating between a pre-defined minimum and maximum speed and up to a pre-defined fueling limit. This limit is in turn based on intake manifold air pressure, temperature, barometric conditions, etc. as well as the mechanical performance limits of the engine.

A second example of governor type is a "full-range" governor (4.2) which allows the driver to maintain a target engine speed based on pedal position input. Total fueling quantity is automatically adjusted to maintain that speed in the presence of variable engine load conditions.

A third example governor is vehicle cruise control (4.3), which allows the driver to input a setpoint for vehicle speed so that the engine maintains that ground speed without further accelerator pedal input. A fourth example is an engine speed governor (4.4), such as what might allow a transmission power take-off (PTO) to drive auxiliary equipment at an elevated engine speed.

The fueling parameters for all governor types are defined and stored within the virtual dual fuel governor (VG) so that the dual fuel controller can precisely maintain total fuel demand through an optimal fuel mixture while in dual-fuel mode of operation. Additional governor types (e.g. load-based speed control) can be added and stored as appropriate for each particular make/model of engine.

Fueling parameters for each governor type can be calibrated manually (i.e. from a priori information) or trained automatically (i.e. through machine-learning) during diesel-only operation. In either case, the total fuel demand from the VG governor matches the diesel ECM so that overall engine performance is equivalent in diesel-only and dual fuel modes of operation.

The virtual dual fuel governor (VG) also allows the user to select governor type (4.5) for compatibility with vehicle configuration (e.g. automatic or manual transmission) and user operation. The dual fuel VG infers appropriate type through on-line adaptation, driver input, and/or diagnostic service tool settings.

In dual fuel mode of operation, the virtual dual fuel governor (VG) calculates total fuel demand (4.6) based on the selected governor type, then apportions that demand with an optimal blend of primary and secondary fuels. The VG calculates primary fuel demand (4.7) and limits diesel fuel consumption rate (4.11) to that specified amount through feedback control. One exemplary embodiment uses the torque-speed control interface via CAN but may also use a direct electrical interface to the diesel ECM.

The virtual dual fuel governor (VG) also calculates secondary fuel demand (4.8) and monitors gas system parameters such as gas flow rate, pressure, temperature, etc. through direct sensing. Gas flow measurement (4.9) can be accomplished through an arithmetic flow estimate, based on differential pressure and gas temperature, and/or using a hot-wire anemometer. The preferred embodiment allows the VG to control secondary fuel flow (4.10) and substitute fuel quantity on an energy-equivalent basis.

During transient engine operation, the virtual dual fuel governor (VG) prioritizes fast-acting diesel injection. Diesel demand is controlled (4.11) based on the measured secondary fuel response time. Gas rates are then increased (4.10) during steady-state operation for maximum fuel economy, emissions improvement, etc.

What I claim is:

1. A virtual dual fuel governor comprising programming configured to:
   receive driver input from a vehicle controller area network;
   calculate a total fuel demand;
   calculate a control diesel fuel demand;
   calculate a secondary fuel demand;
   send the secondary fuel demand to a secondary fuel flow controller to control a flow of secondary fuel to a diesel engine;
   send the control diesel fuel demand to a diesel electronic control module which uses the diesel fuel demand to control a flow of diesel fuel to the diesel engine, and
   calculate a diesel demand using a measured secondary fuel flow.

2. The virtual dual fuel governor of claim 1, where the measured secondary fuel flow is accomplished through an arithmetic flow estimate, based on differential pressure and gas temperature, and/or using a hot-wire anemometer.

3. The virtual dual fuel governor of claim 1, wherein driver input includes at least one of a pedal position and a vehicle cruise control input.

4. The virtual dual fuel governor of claim 1, wherein the virtual dual fuel governor is configured to receive data related to engine operating parameters.

5. The virtual dual fuel governor of claim 4, wherein the operating parameters include at least one of engine speed, diesel fuel consumption rate, manifold air pressure (MAP), and manifold air temperature (MAT).

6. The virtual dual fuel governor of claim 1, wherein the virtual dual fuel governor is further configured to select a governor type/mode.

7. The virtual dual fuel governor of claim 6, wherein the selection is based on one of an automatic selection and user input.

8. The virtual dual fuel governor of claim 6, wherein the governor type/mode is at least one of a min/max demand, a full-range demand, a vehicle cruise control (VCC) demand, and an engine speed demand.

9. The virtual dual fuel governor of claim 8, wherein the governor type-mode is the min/max demand, wherein the min/max demand governor type/mode is configured to allow a driver to control total fuel demand directly via a pedal position when the diesel engine is operating between a pre-defined minimum and a maximum speed and up to a pre-defined fueling limit, the limit being based on at least one of intake manifold air pressure, temperature, and barometric conditions.

10. A vehicle comprising:
   a diesel engine configured to receive diesel fuel and a secondary fuel;
   a secondary fuel controller configured to control a flow of secondary fuel to the diesel engine;
   a diesel engine control module configured to control a flow of diesel fuel to the diesel engine, wherein the diesel engine control module is configured to control flow of diesel fuel to the diesel engine based on a control diesel fuel command generated by a virtual dual fuel governor and the secondary fuel controller is configured to control the flow of secondary fuel to the diesel engine based on a second fuel demand generated by the virtual dual fuel governor, wherein the virtual dual fuel governor is configured to calculate the diesel demand using a measured secondary fuel flow.

11. The vehicle of claim 10, where the secondary fuel flow measurement is accomplished through an arithmetic flow estimate, based on differential pressure and gas temperature, and/or using a hot-wire anemometer.

12. The vehicle of claim 10, wherein the virtual dual fuel governor is configured to receive data related to engine operating parameters.

13. The vehicle of claim 12, wherein the operating parameters include at least one of engine speed, diesel fuel consumption rate, manifold air pressure (MAP), and manifold air temperature (MAT).

14. The vehicle of claim 10, wherein the virtual dual fuel governor is further configured to select a governor type/mode.

15. The vehicle of claim 14, wherein the selection is based on one of an automatic selection and user input.

16. The vehicle of claim 14, wherein the governor type/mode is at least one of a min/max demand, a full-range demand, a vehicle cruise control (VCC) demand, and an engine speed demand.

17. The vehicle of claim 16, wherein the governor type-mode is the min/max demand, wherein the min/max demand governor type/mode is configured to allow a driver to control total fuel demand directly via a pedal position when the diesel engine is operating between a pre-defined minimum and maximum speed and up to a pre-defined fueling limit, the limit being based on at least one of intake manifold air pressure, temperature, and barometric conditions.

* * * * *